United States Patent [19]
Durrani

[11] Patent Number: 6,042,174
[45] Date of Patent: Mar. 28, 2000

[54] LATCHING AND CONTROL APPARATUS FOR AN AUTOMOTIVE VEHICLE CONVERTIBLE ROOF

[75] Inventor: Sheryar Durrani, Canton, Mich.

[73] Assignee: ASC Incorporated, Southgate, Mich.

[21] Appl. No.: 08/916,821

[22] Filed: Aug. 22, 1997

[51] Int. Cl.[7] .................................................... B60J 7/12
[52] U.S. Cl. ..................... 296/121; 296/122; 296/117; 296/107.12; 292/DIG. 5
[58] Field of Search ........................ 296/107.09, 107.12, 296/121, 122, 117; 292/DIG. 5

[56] References Cited

U.S. PATENT DOCUMENTS

| | | |
|---|---|---|
| 404,405 | 6/1889 | Haughey . |
| 543,561 | 7/1895 | Schmitz ................................. 296/121 |
| 1,056,333 | 3/1913 | Hill . |
| 1,174,366 | 3/1916 | Van Den Plas . |
| 1,269,311 | 6/1918 | Rixson . |
| 1,784,279 | 12/1930 | Ellerbeck . |
| 1,831,494 | 11/1931 | Hynes et al. . |
| 1,856,531 | 5/1932 | Berg . |
| 1,892,512 | 12/1932 | Kemp . |
| 1,905,814 | 4/1933 | Orlow . |
| 1,929,371 | 10/1933 | Hamilton . |
| 1,988,346 | 1/1935 | Wagner . |
| 2,007,873 | 7/1935 | Paulin . |
| 2,201,330 | 5/1940 | Wernig et al. . |
| 2,230,140 | 1/1941 | Falcon ..................................... 296/117 |
| 2,267,471 | 12/1941 | Keller . |
| 2,297,820 | 10/1942 | Westrope . |
| 2,329,802 | 9/1943 | Westrope . |
| 2,331,603 | 10/1943 | Falcon ..................................... 296/117 |
| 2,360,524 | 10/1944 | Simpson . |
| 2,368,133 | 1/1945 | Galamb . |

(List continued on next page.)

FOREIGN PATENT DOCUMENTS

| | | |
|---|---|---|
| 493260 | 5/1950 | Belgium . |
| 0 188 774 | 12/1985 | European Pat. Off. . |
| 0 261 379 A2 | 8/1987 | European Pat. Off. . |
| 0 492 006 | 12/1990 | European Pat. Off. . |
| 0 494 366 A2 | 11/1991 | European Pat. Off. . |
| 1.049.026 | 12/1953 | France . |
| 805229 | 5/1951 | Germany . |
| 1505721 | 7/1970 | Germany . |
| 1 755 619 | 8/1971 | Germany . |
| 3733 892 | 10/1987 | Germany . |
| 36 35 887 A1 | 5/1988 | Germany . |
| 38 16 060 A1 | 5/1988 | Germany . |
| 40 10 276 A1 | 4/1990 | Germany . |
| 2-144226 | 6/1990 | Japan . |

(List continued on next page.)

OTHER PUBLICATIONS

"Saab Owners Workshop Manual" by Haynes Publications, Inc., 1981, 1986, pp. 238–239.

7 Sheets of photographs showing the BMW 318 Series convertible topstack header latching system.

ASC Drawing entitled "1990 Saab Convertible, Top Stack Assembly—Cover", W–63X0–4960–AXXX, Sheet No. 5, May 2, 19904.

ASC Drawing entitled "1990 Chrysler P–27 Convertible, Top Cover Assembly", W–39X0–4960–AXXX, Sheet No. 4F, May 15, 1990.

Manual of Latch Handle and Lock Assembly used in a convertible roof for the Geo metro (on or before 1992).

(List continued on next page.)

*Primary Examiner*—Dennis H. Pedder
*Attorney, Agent, or Firm*—Harness, Dickey & Pierce, P.L.C.

[57] ABSTRACT

A latching and control apparatus for an automotive vehicle convertible roof employs an actuator which operably drives a main gear. In one aspect of the present invention, the main gear causes a latching hook to move from an unlatching position to a latching position. In a further aspect of the present invention, the main gear causes a first structural roof member to move relative to a second structural roof member.

33 Claims, 12 Drawing Sheets

6,042,174
Page 2

U.S. PATENT DOCUMENTS

| | | |
|---|---|---|
| 2,372,583 | 3/1945 | Keller . |
| 2,376,949 | 5/1945 | Westrope . |
| 2,468,251 | 4/1949 | Wiederman . |
| 2,486,905 | 11/1949 | Ackermans . |
| 2,540,454 | 2/1951 | Milhan . |
| 2,560,459 | 7/1951 | Lundberg et al. . |
| 2,564,446 | 8/1951 | Parsons . |
| 2,570,260 | 10/1951 | Milhan . |
| 2,570,261 | 10/1951 | Milhan . |
| 2,580,486 | 1/1952 | Vigmostad . |
| 2,586,648 | 2/1952 | Hale et al. . |
| 2,596,355 | 5/1952 | Ackermans . |
| 2,674,480 | 4/1954 | Vigmostad . |
| 2,704,225 | 3/1955 | Anschuetz et al. . |
| 2,709,621 | 5/1955 | Votypka et al. . |
| 2,741,503 | 4/1956 | Thompson, III . |
| 2,753,202 | 7/1956 | Smith et al. . |
| 2,768,024 | 10/1956 | Spear, Jr. . |
| 2,768,025 | 10/1956 | Spear, Jr. et al. . |
| 2,770,489 | 11/1956 | Garvey et al. . |
| 2,785,914 | 3/1957 | Thomas et al. . |
| 2,831,718 | 4/1958 | Hallek et al. . |
| 2,841,441 | 7/1958 | Evans . |
| 2,852,292 | 9/1958 | Galla . |
| 2,856,231 | 10/1958 | Zeman . |
| 2,869,923 | 1/1959 | Mulichak . |
| 2,879,988 | 3/1959 | Klisch . |
| 2,886,364 | 5/1959 | Smith . |
| 2,895,764 | 7/1959 | Himka et al. . |
| 2,916,327 | 12/1959 | Gilson . |
| 2,926,943 | 3/1960 | Leslie et al. . |
| 2,939,742 | 6/1960 | Dardarian et al. . |
| 3,004,788 | 10/1961 | Dully et al. . |
| 3,059,962 | 10/1962 | Harms et al. . |
| 3,089,719 | 5/1963 | Csizmansky . |
| 3,129,025 | 4/1964 | Krueger ............................ 292/DIG. 5 |
| 3,135,541 | 6/1964 | Kwasek . |
| 3,151,375 | 10/1964 | Schevenell . |
| 3,314,703 | 4/1967 | Fitzpatrick . |
| 3,353,864 | 11/1967 | Antaya et al. . |
| 3,362,740 | 1/1968 | Burns . |
| 3,375,037 | 3/1968 | Hunt, Jr. . |
| 3,400,562 | 9/1968 | Bloss . |
| 3,425,742 | 2/1969 | Rauber, Jr. . |
| 3,443,834 | 5/1969 | Andres . |
| 3,586,360 | 6/1971 | Perrotta . |
| 3,712,665 | 1/1973 | Klein . |
| 3,751,949 | 8/1973 | Castle . |
| 3,845,976 | 11/1974 | Peterson . |
| 3,891,252 | 6/1975 | Lehmann . |
| 3,994,524 | 11/1976 | Lehmann . |
| 4,470,277 | 9/1984 | Uyeda . |
| 4,487,447 | 12/1984 | Schroder . |
| 4,537,440 | 8/1985 | Brockway et al. . |
| 4,618,180 | 10/1986 | Muscat . |
| 4,664,436 | 5/1987 | Eyb . |
| 4,702,505 | 10/1987 | Alexander . |
| 4,712,828 | 12/1987 | Albrecht . |
| 4,720,133 | 1/1988 | Alexander et al. . |
| 4,729,592 | 3/1988 | Tuchiya et al. . |
| 4,746,163 | 5/1988 | Muscat . |
| 4,801,173 | 1/1989 | Trenkler . |
| 4,815,775 | 3/1989 | Mertin et al. ...................... 292/DIG. 5 |
| 4,817,999 | 4/1989 | Drew . |
| 4,828,317 | 5/1989 | Muscat . |
| 4,830,425 | 5/1989 | Muscat . |
| 4,830,426 | 5/1989 | Schlachter et al. . |
| 4,854,634 | 8/1989 | Shiraishi et al. . |
| 4,895,409 | 1/1990 | Konishi et al. . |
| 4,936,626 | 6/1990 | Gmeiner et al. . |
| 4,950,022 | 8/1990 | Pattee . |
| 4,984,841 | 1/1991 | Bauer et al. . |
| 5,004,291 | 4/1991 | Bauer et al. . |
| 5,033,789 | 7/1991 | Hayashi et al. . |
| 5,042,869 | 8/1991 | Brin . |
| 5,046,767 | 9/1991 | Muscat . |
| 5,058,939 | 10/1991 | Miilu . |
| 5,064,241 | 11/1991 | Ohrle . |
| 5,067,768 | 11/1991 | Fischbach . |
| 5,085,483 | 2/1992 | Alexander . |
| 5,118,158 | 6/1992 | Truskolaski . |
| 5,154,479 | 10/1992 | Sautter, Jr. . |
| 5,161,852 | 11/1992 | Alexander et al. . |
| 5,186,516 | 2/1993 | Alexander . |
| 5,195,798 | 3/1993 | Klein et al. . |
| 5,219,199 | 6/1993 | Smith et al. . |
| 5,267,769 | 12/1993 | Bonne et al. . |
| 5,269,586 | 12/1993 | Hahn et al. . |
| 5,301,987 | 4/1994 | Tokarz et al. . |
| 5,328,229 | 7/1994 | Brandt et al. . |
| 5,413,390 | 5/1995 | Fillipi ..................................... 292/96 |
| 5,429,409 | 7/1995 | Corder et al. . |
| 5,435,615 | 7/1995 | Schmitz ................................. 296/121 |
| 5,489,146 | 2/1996 | Fischbach . |
| 5,620,226 | 4/1997 | Sautter, Jr. . |
| 5,624,149 | 4/1997 | Tokarz . |
| 5,667,269 | 9/1997 | Prenger et al. ..................... 296/108 X |
| 5,678,881 | 10/1997 | Tokarz . |
| 5,833,300 | 11/1998 | Russke .................................. 296/108 |

FOREIGN PATENT DOCUMENTS

| | | |
|---|---|---|
| 352786 | 7/1931 | United Kingdom . |
| 413467 | 7/1934 | United Kingdom . |
| 536578 | 5/1941 | United Kingdom . |
| 2 194 759 | 3/1988 | United Kingdom . |
| 2 257 949 | 1/1993 | United Kingdom . |
| WO 96/27509 | 9/1996 | WIPO . |

OTHER PUBLICATIONS

Drawings of latch assembly used in convertible roof for a Geo Tracker (in IDS cover sheet).

Photographs A1–A4 of Porsche 911 front header latch system (prior to Mar. 1994).

Photographs B1–B3 of Mercedes 500SL front header and tonneau cover cam and striker systems (prior to Mar. 1994).

LATCHING AND CONTROL APPARATUS FOR AN AUTOMOTIVE VEHICLE CONVERTIBLE ROOF

BACKGROUND AND SUMMARY OF THE INVENTION

This invention relates generally to automotive vehicle convertible roofs and more particularly to a latching and control apparatus for an automotive vehicle convertible roof.

Traditional soft-top convertible roofs for automotive vehicles typically employ four or five roof bows spanning transversely across the vehicle for supporting a vinyl, canvas or polyester fiber pliable roof cover. The number one roof bow is mounted to a pair of front roof rails and is typically latched to a stationary front header panel of the automotive vehicle body disposed above a windshield. A number two roof bow is typically mounted to a pair of center roof rails which are pivotably coupled to the front roof rails. Furthermore, the number three, four and optional five roof bows are commonly mounted to a pair of rear roof rails which are pivotably coupled to the center roof rails. For example, reference should be made to U.S. Pat. No. 4,720,133 entitled "Convertible Top Structure" which issued to Alexander et al. on Jan. 19, 1988, and U.S. Pat. No. 4,537,440 entitled "Vehicle with a Convertible Top" which issued to Brockway et al. on Aug. 27, 1985.

Many types of conventional, manually and electrically driven number one bow-to-front header latching mechanisms are known. Exemplary latching mechanisms are shown in the following U.S. Pat. Nos. 5,624,149 entitled "Apparatus and Method for Securing a Convertible Roof to an Automotive Vehicle" which issued to Tokarz on Apr. 29, 1997; U.S. Pat. No. 5,269,586 entitled "Device for Lowering the Free End of a Vehicle Cover" which issued to Hahn et al. on Dec. 14, 1993; U.S. Pat. No. 5,154,479 entitled "Power Header Latch for Convertible Top" which issued to Sautter, Jr. on Oct. 13, 1992; U.S. Pat. No. 5,058,939 entitled "Power Latch System" which issued to Miilu on Oct. 22, 1991; U.S. Pat. No. 4,817,999 entitled "Convertible Header Latch Mechanism" which issued to Drew on Apr. 4, 1989; and U.S. Pat. No. 3,712,665 entitled "Lock for a Removable Roof Attachment for Vehicles" which issued to Klein on Jan. 23, 1973.

It is also common to employ a control link coupling each front roof rail to each center roof rail. In such conventional systems, the control link is moved to an over-center position when the vehicle occupant manually pulls down on the number one roof bow, thereby maintaining the number one bow and front roof rail in their fully extended or raised positions. The vehicle occupant then must manually push up on the number one bow to upwardly pivot the front roof rail relative to the center roof rail by moving the control link away from its over-center condition.

In accordance with the present invention, the preferred embodiment of a latching and control apparatus for an automotive vehicle convertible roof employs an actuator which operably drives a main gear. In one aspect of the present invention, the main gear causes a latching hook to move in a somewhat linear extension direction while also being rotated from an unlatching position to a latching position. In a further aspect of the present invention, the main gear causes a lever to move a first structural roof member relative to a second structural roof member. In still another aspect of the present invention, an electric motor and a set of reduction gears are mounted to a number one roof bow for operating the main gear and hook. Another aspect of the present invention provides a biasing means for orienting a latching hook.

The apparatus of the present invention is advantageous over traditional devices in that the present invention is multi-functional by moving a first roof rail relative to a second roof rail while also latching the convertible roof to the automotive vehicle body through use of a single actuator. A further advantage of the present invention is that it provides generally, linearly extended hook movement for achieving an automatic pull down latching function. The latching and control apparatus of the present invention is ideally suited for use with a fully automated soft-top convertible roof. The present invention also reduces latching parts, as well as the associated cost and weight, when compared to many conventional systems. Additional advantages and features of the present invention will become apparent from the following description and appended claims, taken in conjunction with the accompanying drawings.

DETAILED DESCRIPTION OF THE PREFERRED EMBODIMENT

Figure 1:
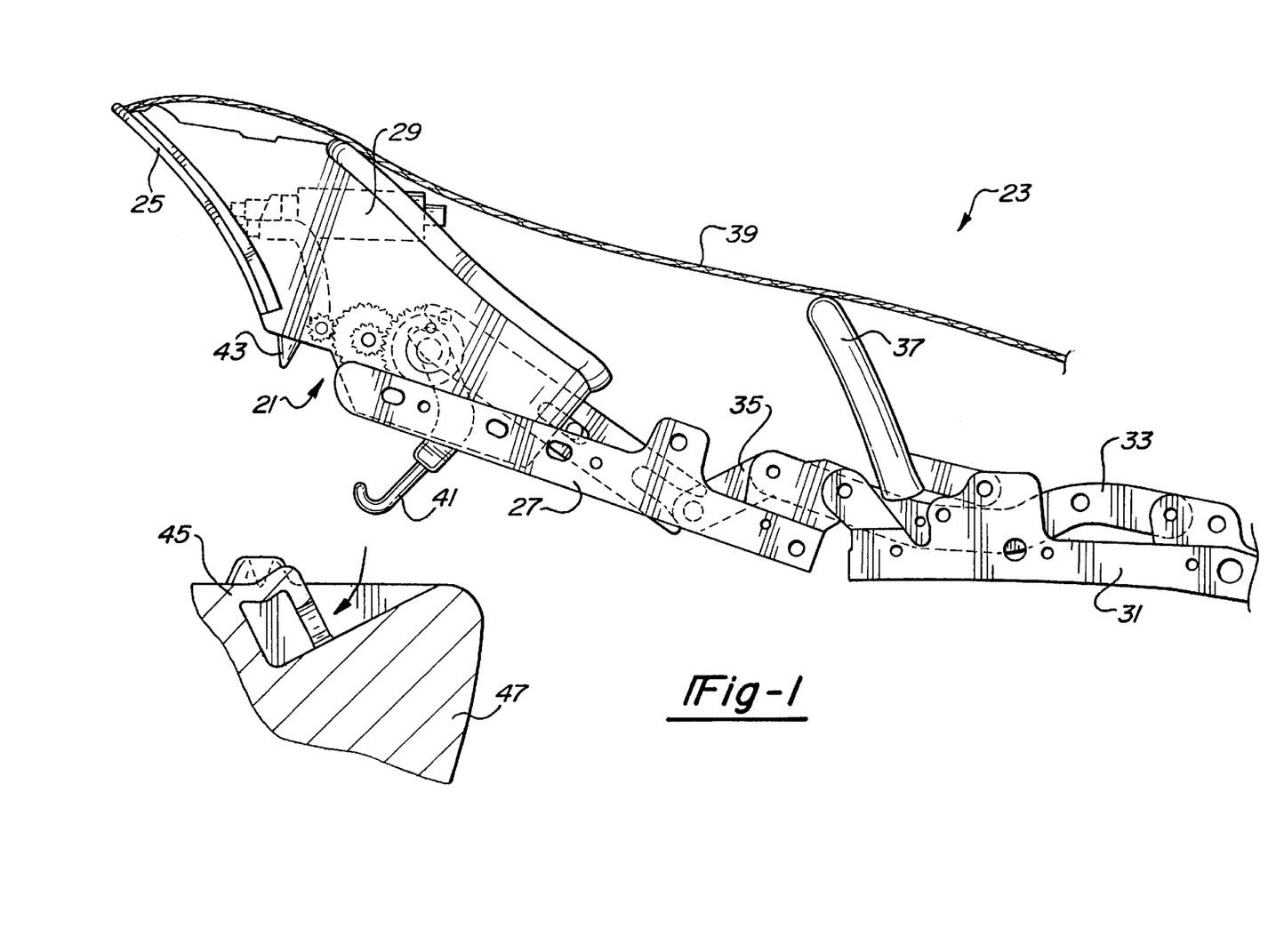
FIG. 1 is a side elevational view showing the preferred embodiment of a latching and control apparatus of the present invention, with a roof cover in cross section.
Figure 2:
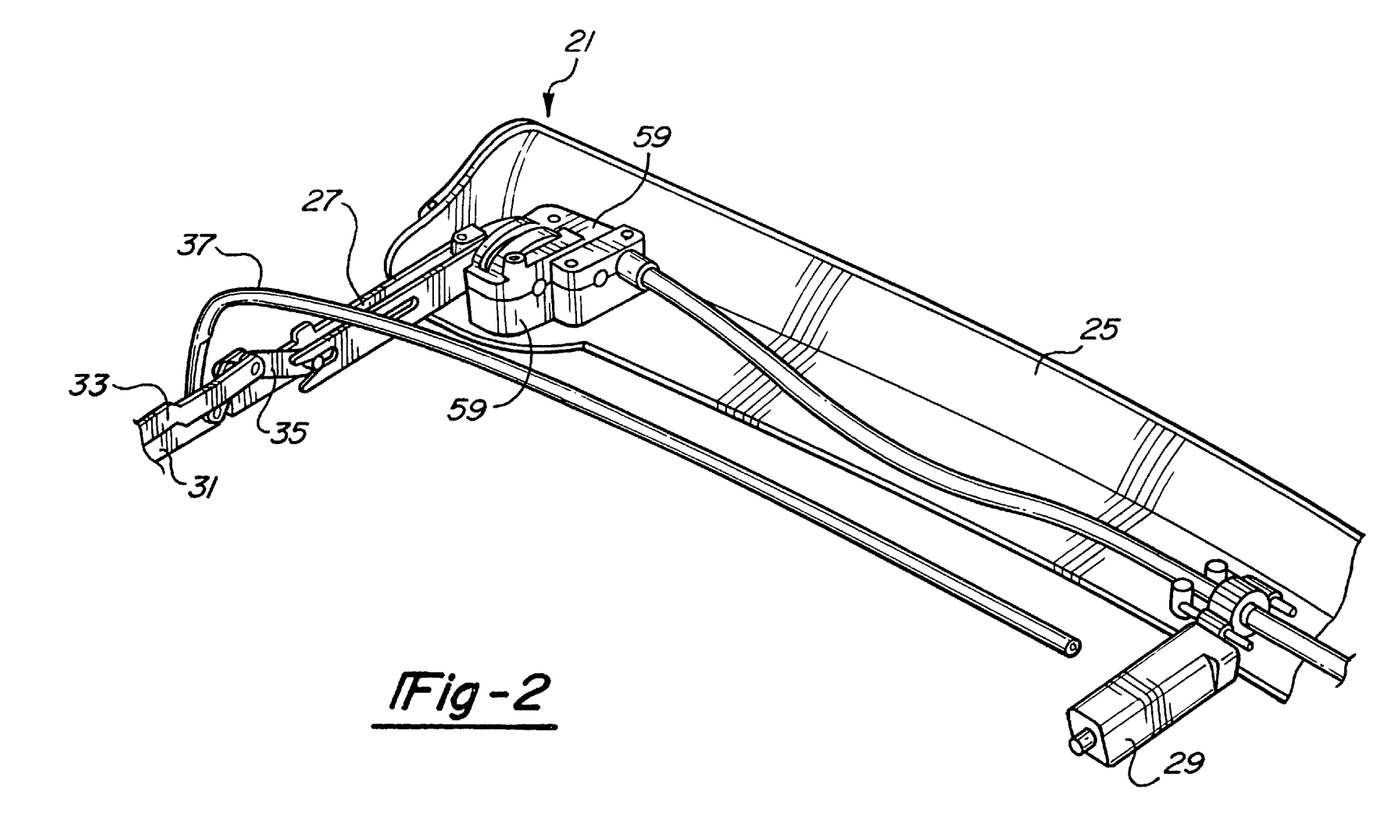
FIG. 2 is a fragmentary, top perspective view showing the preferred embodiment of the latching and control apparatus.
Figure 3:
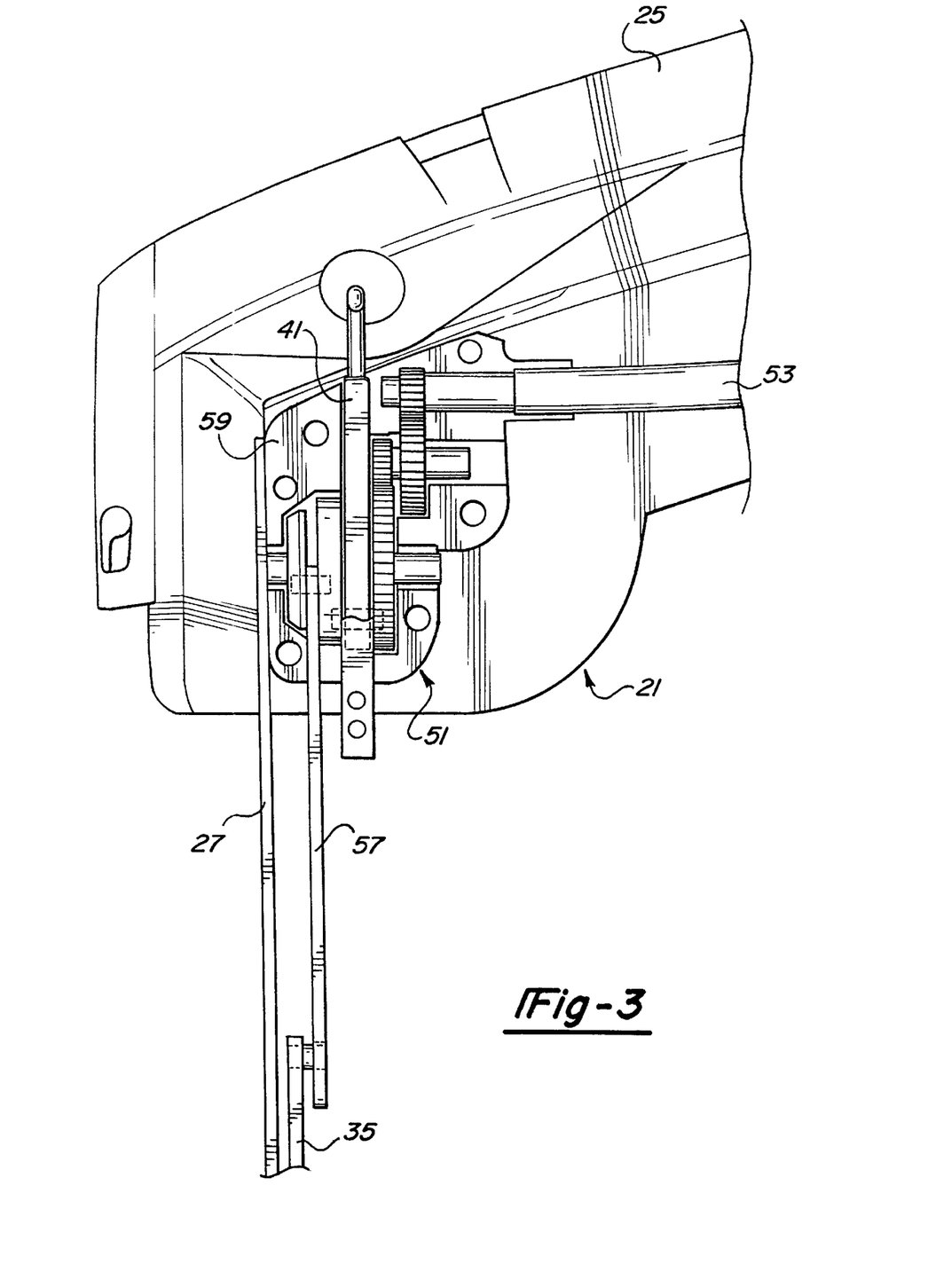
FIG. 3 is a fragmentary, top elevational view showing the preferred embodiment of the latching and control apparatus with a housing removed.
Figure 4:
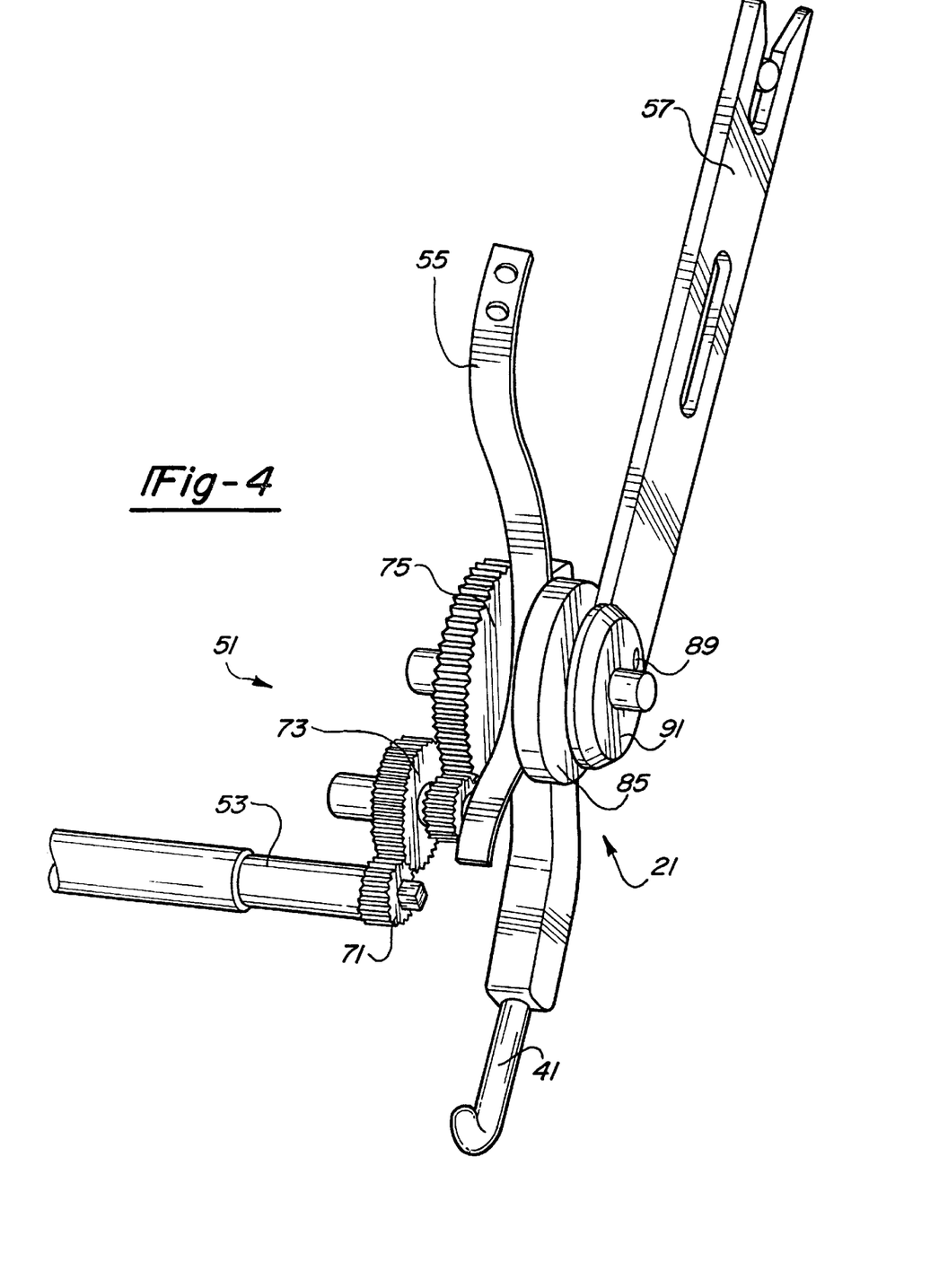
FIG. 4 is a top perspective view showing the preferred embodiment of the latching and control apparatus with a number one roof bow and housings removed.
Figure 5:
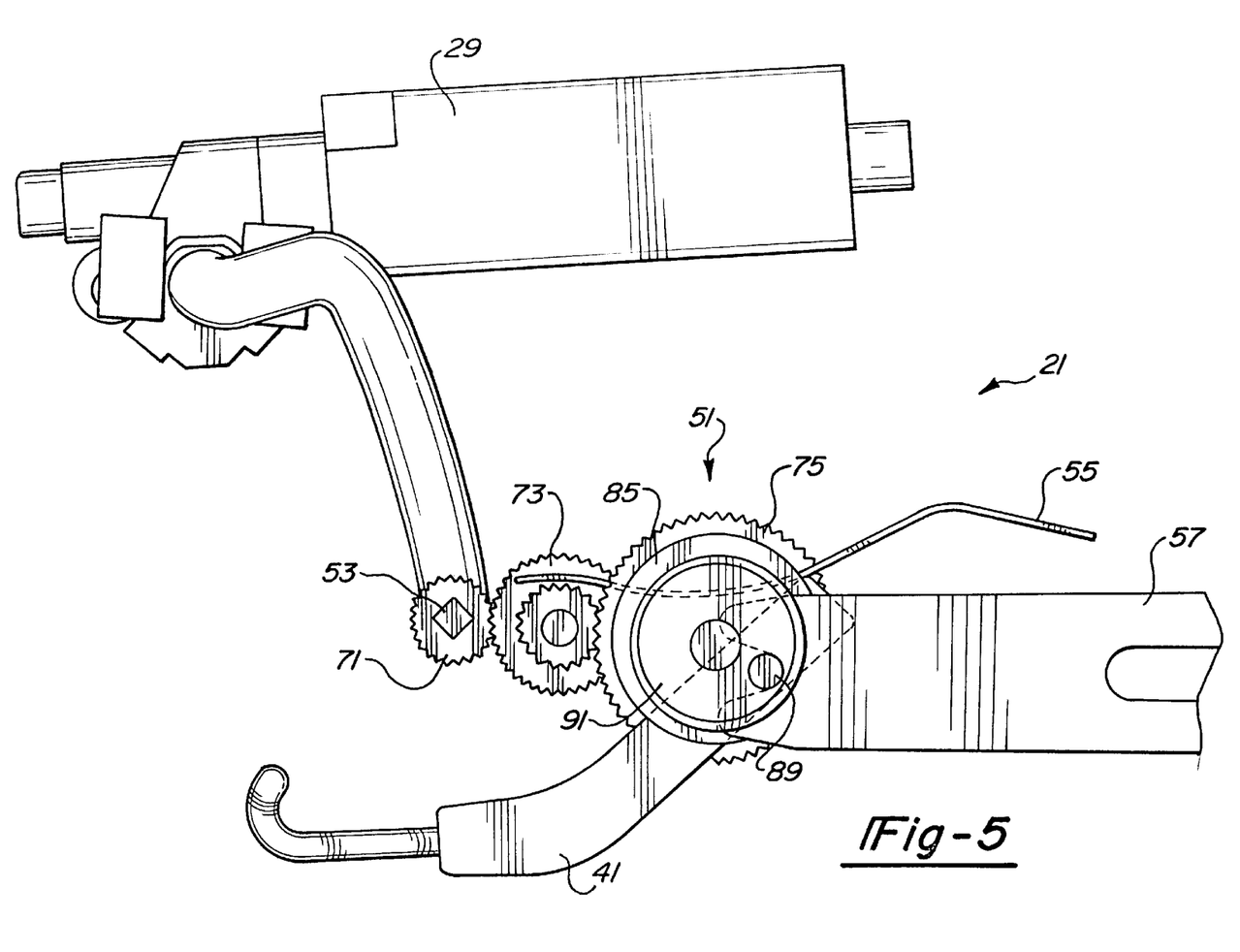
FIG. 5 is a side elevational view showing the preferred embodiment of the latching and control apparatus with the number one roof bow and housings removed.

Referring to FIGS. 1 and 2, the preferred embodiment of a latching and control apparatus 21 of the present invention is used in combination with a soft-top convertible roof 23. Apparatus 21 is screwed to a forwardmost or number one roof bow 25 integrally cast from magnesium as a single piece with a pair of front roof rails 27. Apparatus 21 is symmetrically mounted to each front corner of number one bow 25 and is powered by a single, centrally located fractional horsepower, direct current, electric motor 29. Ideally, electric motor 29 would have its elongated direction located parallel to the elongated direction of number one bow 25 in order to optimize packaging space. Since apparatus 21 is symmetrical identical on both sides of the vehicle, only one side will be further discussed hereinafter.

A center roof rail 31 is pivotably coupled to a corresponding front roof rail 27 by an over-center link assembly consisting of an offset control link 33 and a control extension arm 35. A number two roof bow 37 upwardly extends from center roof rail 31. A number three roof bow (not shown) and a number four roof bow (not shown) upwardly extend from a rear roof rail (not shown) pivotably coupled to center roof rail 31. Such a construction is disclosed in U.S. patent application Ser. No. 08/916,822, now U.S. Pat. No. 5,903,119 entitled "Convertible Roof Actuation Mechanism" invented by Steven G. Laurain, Michael T. Willard and William A. Sims, which is being filed concurrently herewith; this application is incorporated by reference herewithin. The roof bows all extend transverse or crosscar between the corresponding pairs of roof rails. Furthermore, a pliable soft-top roof cover 39 is fastened to and spans between the roof bows. A hook 41 projecting from apparatus 21 and a conical locator pin 43 downwardly projecting from a corner of number one bow 25 operably engage with a corresponding latching receptacle structure 45 in an upper corner of a front header panel of automotive vehicle body.

Referring now to FIGS. 1, 3–5 and 9, latching and control apparatus 21 includes reduction gearing 51, an elongated drive cable 53, a leaf spring 55, a lever 57 and hook 41. Reduction gearing 51 is located and journalled within a pair of housings 59 secured to each other and to either the top or bottom of number one bow 25. At least one housing 59 can be integrally cast as part of the number one bow. Electric motor 29 operably rotates a pair of torque cables 53 within sheaths. Each cable 53 has a square cross sectional shape adjacent to its distal end and is preferably manufactured by Grand Rapids Controls Inc. of Grand Rapids, Mich. A quarter inch, flexible shaft cable having a swaged square end has been found suitable. A small drive gear 71 rotates in concert with the distal end of cable 53 about a common centerline. An idler gear 73 has a first gear diameter enmeshed with drive gear 71 and a smaller second gear diameter coaxially aligned for rotation with the first gear diameter. There is an approximately 2:1 gear ratio between the idler gear and the drive gear. A large main gear 75 is enmeshed with the small second gear diameter of idler gear 73 such that an approximately 3.4:1 gear ratio is achieved between main gear 75 and idler gear 73.

A first pin 81 outwardly projects from a face of main gear 75. Pin 81 has a circular-cylindrical peripheral surface which rotatably engages in a transversely oriented hole 83 extending through a base of the J-shaped hook 41. A round bearing plate 85 is coaxially aligned for concurrent rotation with main gear 75. A second circular-cylindrical pin 87 inwardly projects from a face of bearing plate 85 for rotatable engagement in hole 83. It should be appreciated that pins 81 and 87 may be replaced by a single pin or other projection.

A third pin 89 outwardly projects from another face of bearing plate 85; third pin 89 also has a circular-cylindrical peripheral surface and is angularly offset by 45 degrees from second pin 87. Third pin 89 is also located closer to the rotational centerline of bearing plate 85 than is second pin 87. A first end of lever 57 is engaged by third pin 89. Moreover, a crankplate 91 is outwardly disposed on the opposite side of lever 57 from bearing plate 85. Third pin 89 spans between bearing plate 85 and crankplate 91. The gears, bearing plate and crankplate are all preferably made from alloy steel 4340, normalized to 1600 degrees Fahrenheit with a hardness of 363 Bhn. A longitudinally elongated slot 99 of lever 57 receives a circular fulcrum 101 transversely projecting from front roof rail 27. Lever 57 is preferably stamped from steel and has a first bifurcated end 103 for selectively engaging third pin 89, and a second bifurcated end 105 for selectively engaging a circular extension pin 107 coupled to extension arm 35.

Figure 10:
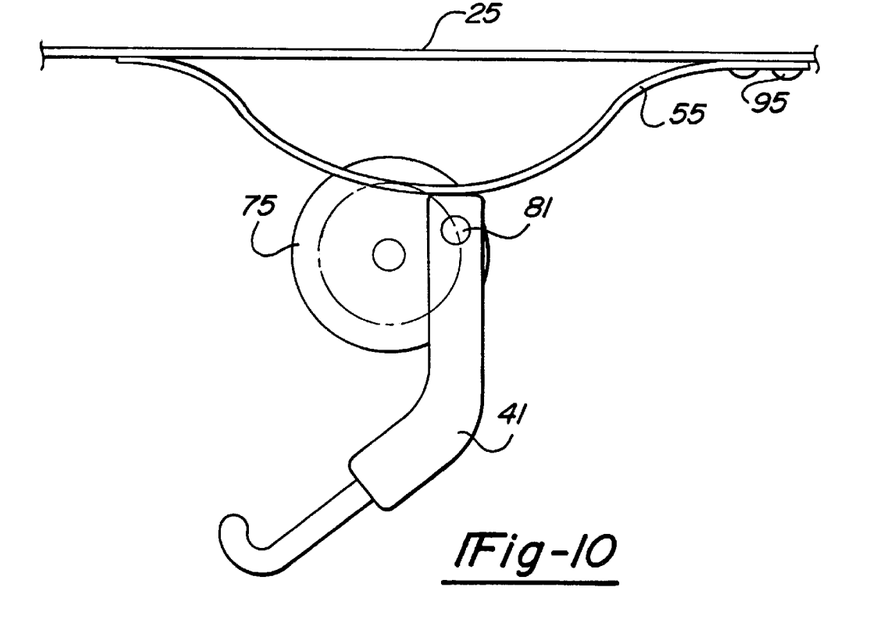
FIGS. 10–13 are diagrammatic side elevational views showing the operational positions of a hook and spring employed in the preferred embodiment of the latching and control apparatus.

As is illustrated in FIG. 10, spring 55 has a mounting end secured to either housing 59 or number one bow 25 by a pair of screws 95, rivets or snap-on flanges. An opposite end of spring 55 compressibly rides along an adjacent portion of housing 59 or number one bow 25. Spring 55 is a fairly strong leaf spring, made from spring steel, and has an undulating free state shape. However, other types of compression, torsion or tension springs may alternately be employed.

The operation of latching and control apparatus 21 can be observed by reference to FIGS. 6–8 and 10–13. When the electric motor is energized, it will operably rotate main gear 75 and the crankplate 180 degrees from the position shown in FIG. 6 to the position approximately shown in FIG. 7, wherein third pin 89 will concurrently push lever 57 in a generally linear rotated manner about fulcrum 101. This driving action causes second bifurcated end 105 of lever 57 to fully engage extension pin 107 thereby downwardly pivoting front roof rail 27 and the number one bow relative to center roof rail 31, in a fully automatic manner. This movement also causes the over-center link assembly to move to an over-center position wherein front roof rail 27 is locked in a fully extended or raised position abutting against the stationary front header panel of the automotive vehicle body.

Figure 6:
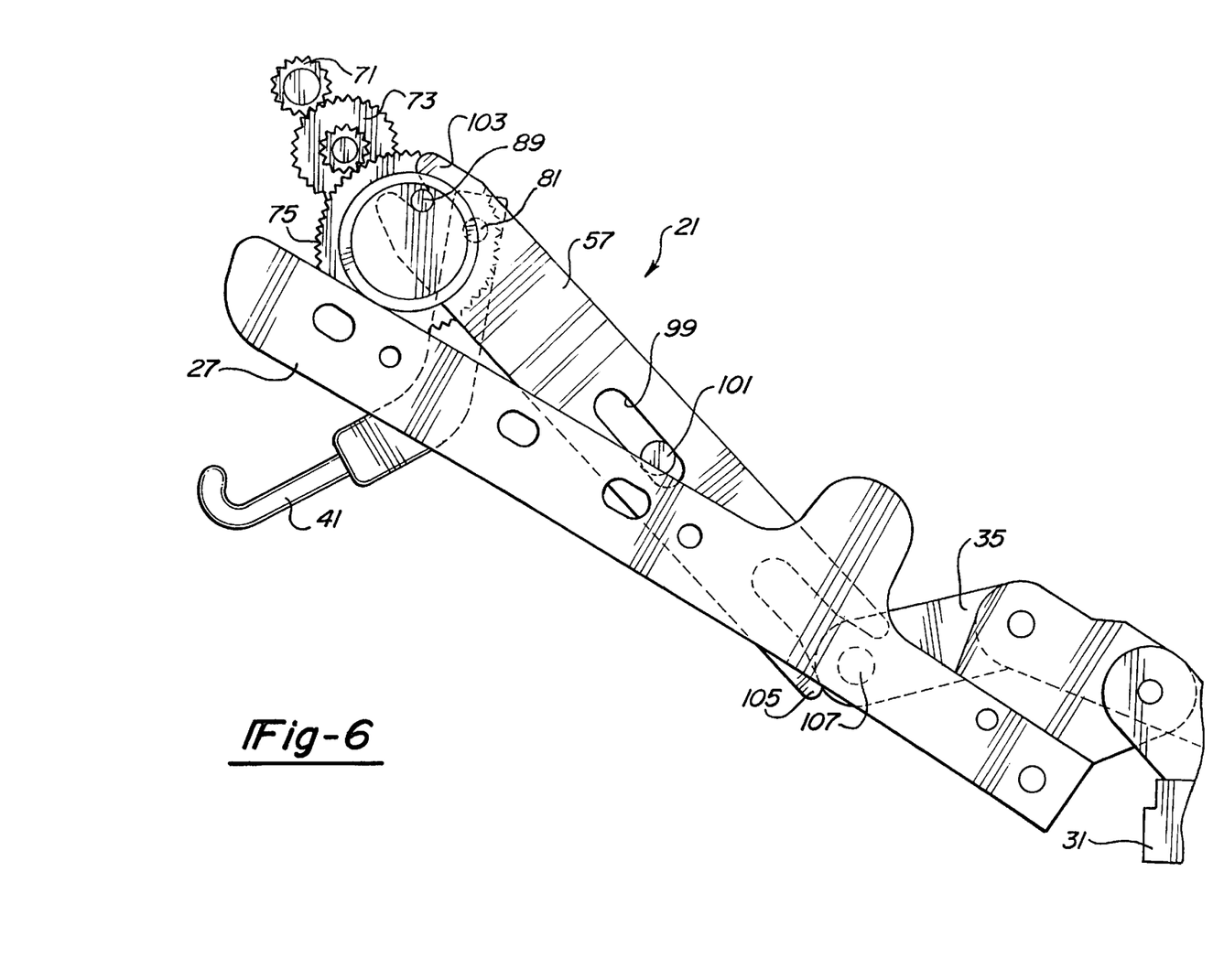
FIGS. 6–8 are diagrammatic side elevational views showing the operational positions of the preferred embodiment of the latching and control apparatus.
Figure 7:
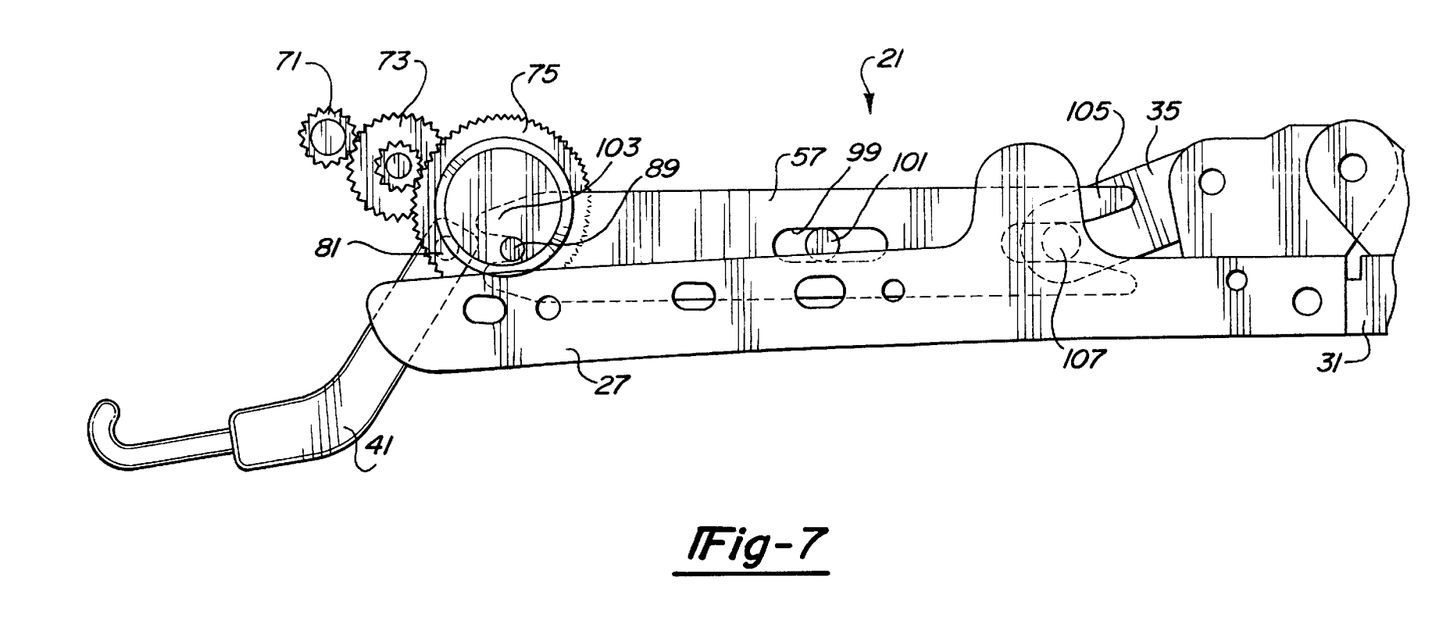
Figure 11:
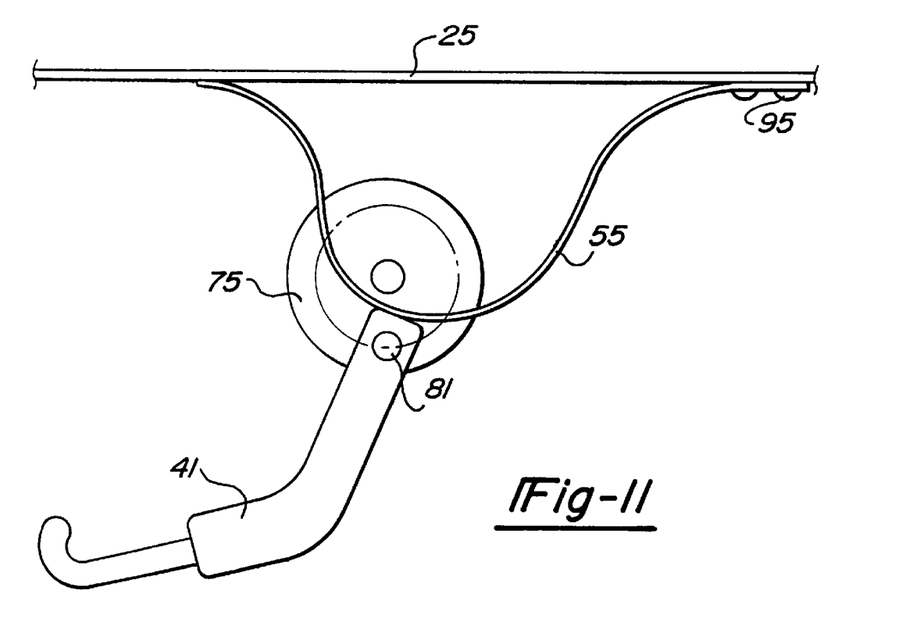

J-hook 41 is downwardly extended away from the pivot axis of main gear 75 and away from the number one bow due to the rotational movement of first pin 81 and the second pin journalling the base of J-hook 41, concurrently with the rotation of main gear 75 from the position of FIG. 6 to that of FIG. 7. J-hook 41 is illustrated as being somewhat linearly moved to the beginning of an extended power pull down position for reaching out and grabbing the latching receptacle structure which may be slightly spaced away from the number one bow. FIGS. 10 and 11 demonstrate the biasing action of spring 55 against the flat end of J-hook 41. Thus, spring 55 serves to bias hook in the illustrated predetermined orientations to clear the latching receptacle structure mounted to the front header panel while also acting as a camming surface in combination with the end formation of J-hook 41 to reorient J-hook 41 throughout its extension and latching motions of travel.

Figure 8:
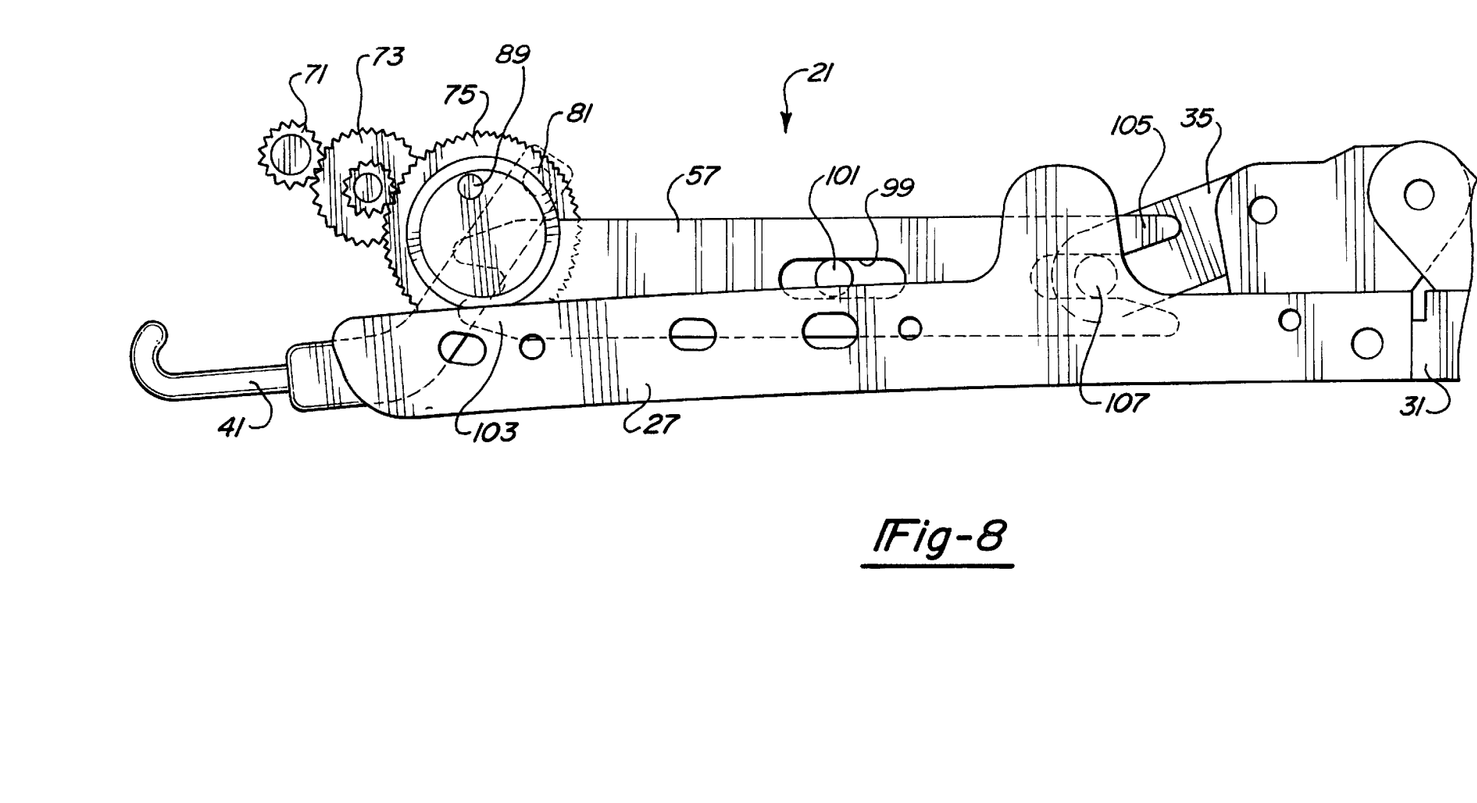
Figure 9:
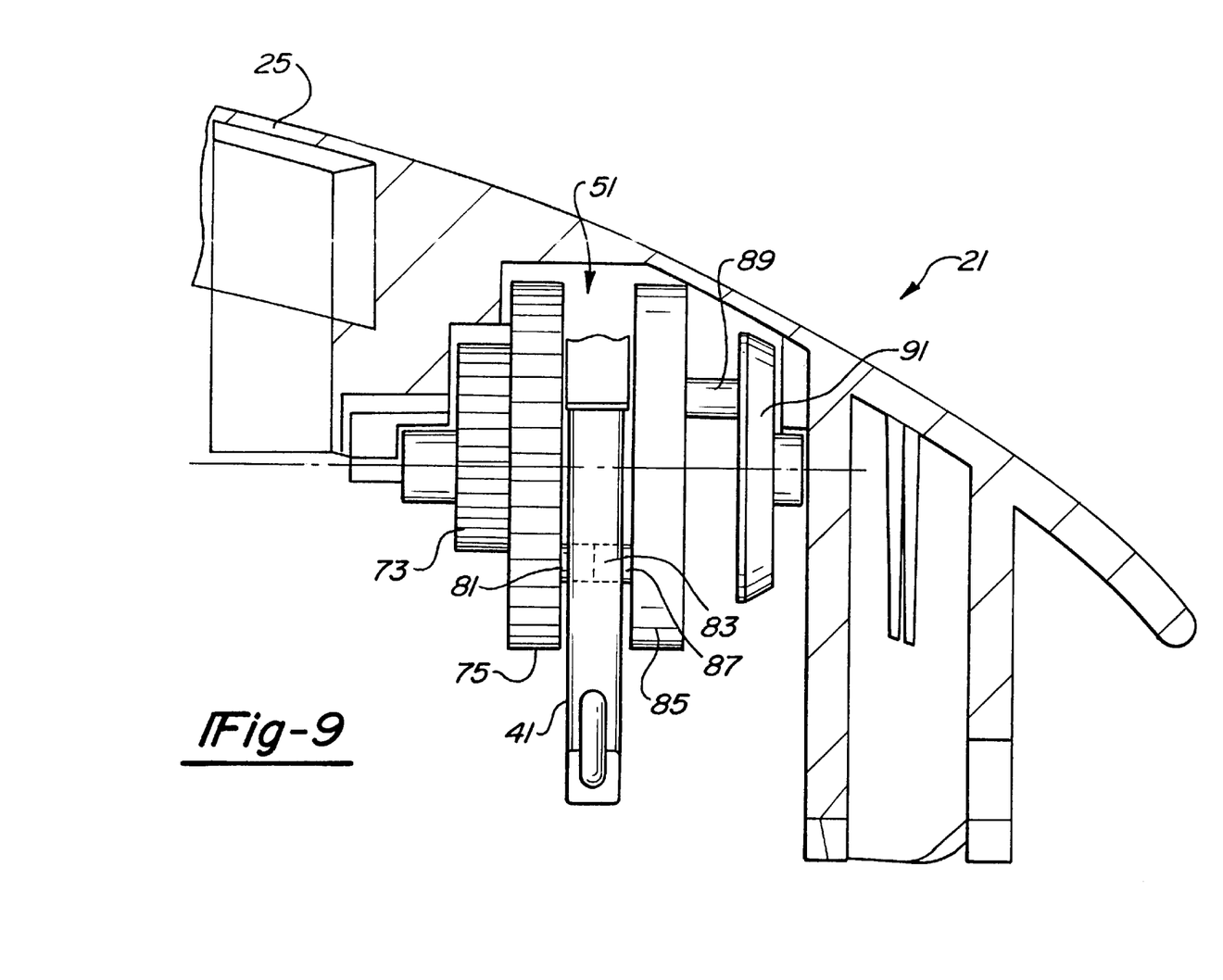
FIG. 9 is a front elevational view, partially in section, showing the preferred embodiment of the latching and control apparatus with a housing removed.
Figure 12:
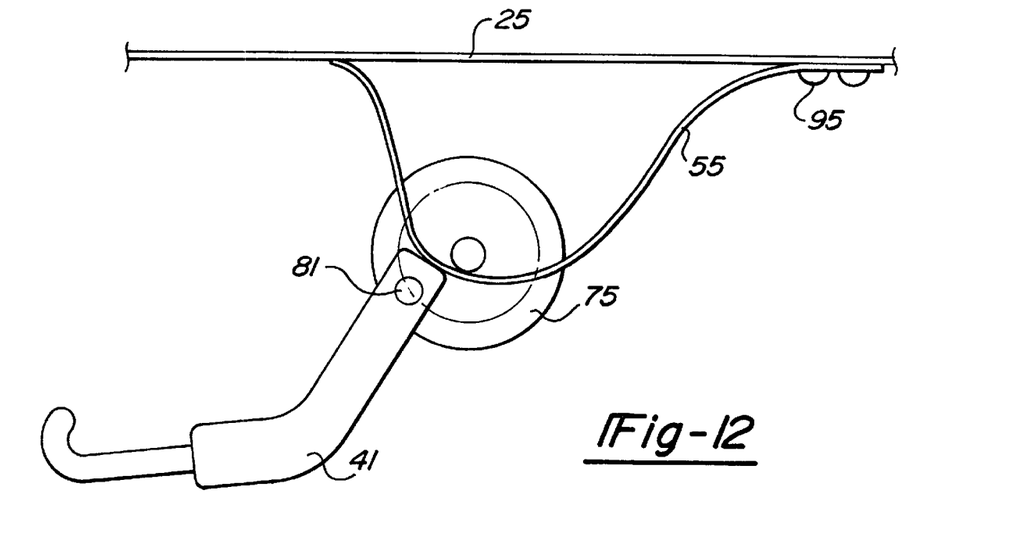
Figure 13:
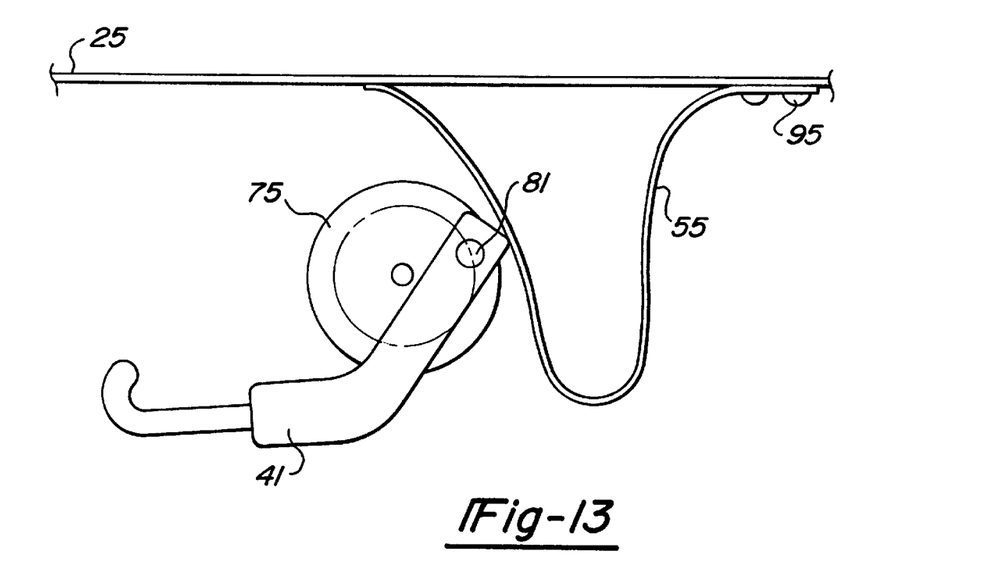

During the second 180 degrees of rotation between FIGS. 7 and 8 of main gear 75, first pin 81 and the second pin will further act in combination with spring 55, as shown in FIGS. 12 and 13, to rotate J-hook 41 from an unlatching position (FIG. 7) to a latching position (FIG. 8) fully engaging the front header latching receptacle structure. J-hook 41 moves in a fore-and-aft rotational manner about a moving pivot point oriented transversely relative to the automotive vehicle. During this further rotation, lever 57 remains stationary and is disengaged from the third pin. Third pin 89 abuts against a top edge of lever 57 to act as a J-hook stop. It may be alternatively desirable to encourage forward movement of lever 57 by fully surrounding end 103 around third pin 89 or by providing a return spring between an end of slot 99 and fulcrum 101. Reversal of the electric motor, gearing and lever causes an automatic upward pivoting of the number one bow and front roof rail relative to the center roof rail and number two bow.

An associated microprocessor, analog or solid state component based electronic control unit and system would operate as follows: first, the vehicle occupant actuates a passenger compartment mounted switch to raise the convertible roof to its extended position. Second, a hydraulic pump and cylinder, or electric motor actuator will raise the convertible roof top stack mechanism (including the roof bows and rails) toward its extended position. Third, the latching electric motor receives an electric signal from a microswitch indicating that the center roof rails and rear roof rails are in their final extended and raised positions. Fourth, the latching electric motor is energized to extend the J-hooks while downwardly pivoting the front rails and one bow relative to the center rails. Fifth, the latching electric motor continues the rotation of the J-hooks from their unlatched positions to their latched positions in order to secure the convertible roof to the front header panel. Finally, the electric motor is deenergized when either a stall torque is reached, indicating full latching engagement, or a microswitch associated with the J-hooks sends an appropriate electrical signal to the electronic control unit.

Figure 14:
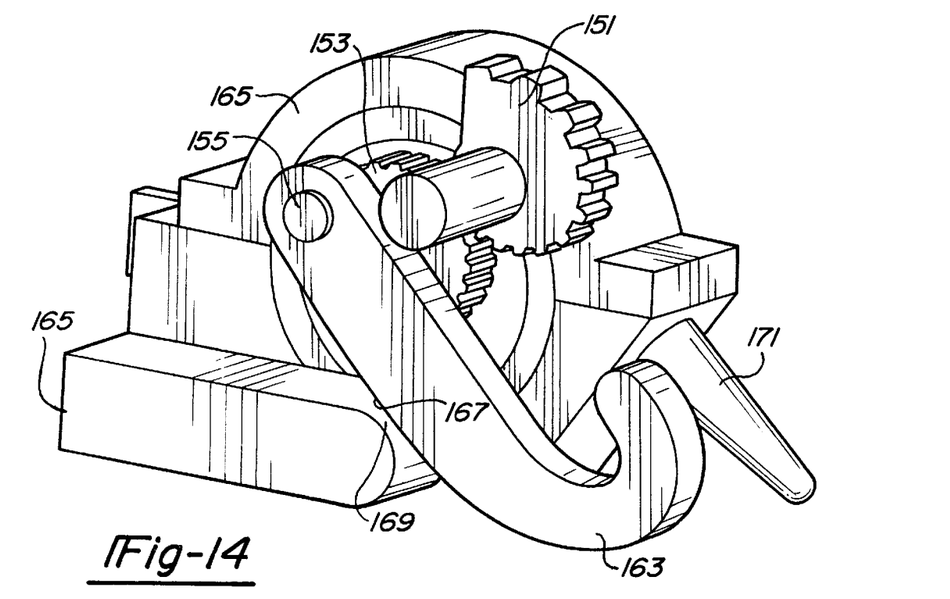
FIG. 14 is a top perspective view showing an alternate embodiment of the latching and control apparatus.
Figure 15:
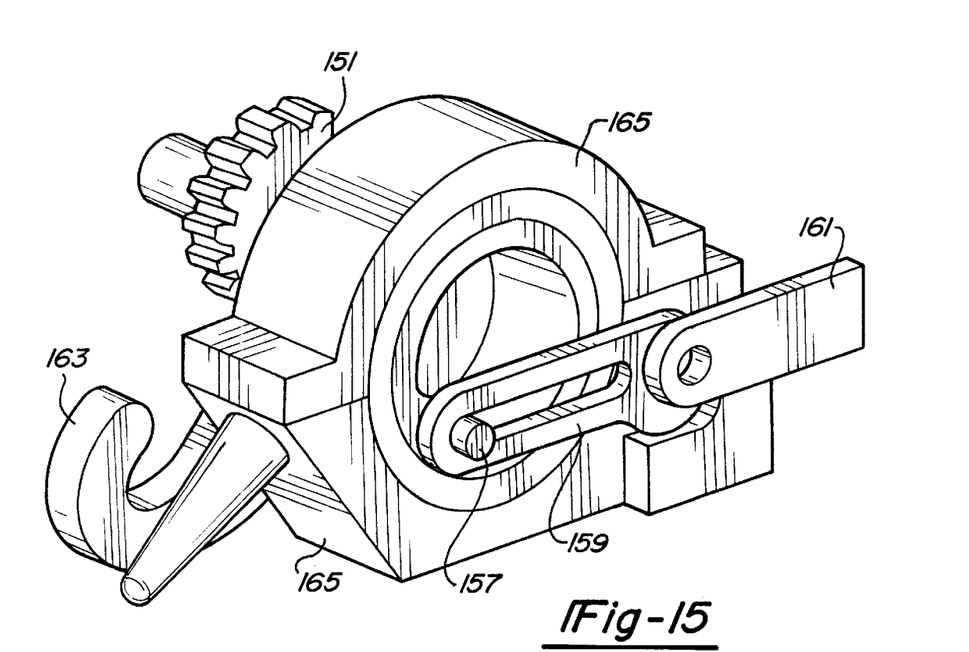
FIG. 15 is a top perspective view, taken opposite that of FIG. 14, showing the alternate embodiment of the latching and control apparatus.

An alternate embodiment of the latching and control apparatus is illustrated in FIGS. 14 and 15. A cable and drive gear (not shown) rotate an idler nautilus gear 151. A main nautilus gear 153 is enmeshed with idler nautilus gear 151 and contains opposed and independently positioned drive bosses or projections 155 and 157, offset from each other. Nautilus gears 151 and 153 have varied spacing of gear teeth such that at the beginning, they have a 3:1 gear ratio, and at the end of their rotational travel, they have a 1:3 gear ratio; this causes a nine-fold increase in mechanical advantage during their rotational travel. Thus, rotation of main nautilus gear 153 causes projection 157 to pull a clevis-type drive lever 159 in a generally linear and slightly rotational manner. This motion pulls down on an over-center linkage assembly 161 while also extending a J-hook 163 in preparation for latching. Once the over-centering action is complete, drive lever 159 rests on a cast retention boss so as to permit it to idle during the latching function by virtue of its lost motion slot. The latching function is achieved by a continued rotation of main gear 153 within housings 165, acting on J-hook 163. The J-hook is spring-loaded and its motion can be tailored by varying the interface between a surface 167 in relation to an integrally cast number one bow rider cam 169. A conical locator pin 171 also projects from housing 165.

While the preferred embodiment of a latching and control apparatus has been disclosed, it will be appreciated that various other constructions can be used without departing from the present invention. For example, the latching and rail-to-rail control features can be used independent of each other. Furthermore, the disclosed latching system can be inversely mounted on the relatively stationary front header panel. A manually actuated handle can also be employed in place of the electric latching motor. Moreover, the latching and control apparatus can be used to latch a five bow to a tonneau cover or rear body portion of the automotive vehicle while the control feature can be employed between rear roof portions, such as between a five bow and a rear roof rail. A pair of synchronized motors or a hydraulic actuator may be substituted for the disclosed single electric motor. It should also be appreciated that other hook, gear, lever and linkage shapes and combinations can alternately be used in keeping with the functions of the present invention. Various materials have been disclosed in an exemplary fashion, however, other materials may of course be employed. It is intended by the following claims to cover these and any other departures from the disclosed embodiments which fall within the true spirit of this invention.

The invention claimed is:

1. An apparatus for controlling an automotive vehicle convertible roof, said apparatus comprising:
   a first structural member serving as part of said convertible roof;
   a second structural member serving as part of said convertible roof located adjacent and movable relative to said first structural member;
   a lever movably affixed to said first structural member, said lever having a bifurcated end and an elongated slot;
   a fulcrum operably received in said slot; and
   a linkage assembly operable to couple said first structural member to said second structural member;
   wherein movement of said lever relative to said first structural member causes one of said structural members to move relative to the other of said structural members.

2. The apparatus of claim 1 further comprising a powered actuator moving said lever after one of said structural members is substantially moved to a raised position.

3. The apparatus of claim 2 further comprising:
   a main gear rotating in response to energization of said actuator, said main gear being rotatably mounted to said first structural member; and
   a fulcrum disposed on one of said structural members;
   wherein rotation of said main gear causes said lever to pivot about said fulcrum to pivot said one of said structural members.

4. The apparatus of claim 2 further comprising reduction gearing coupling said actuator to said lever.

5. An apparatus for controlling an automotive vehicle convertible roof, said apparatus comprising:
   a first structural member serving as part of said convertible roof;
   a second structural member serving as part of said convertible roof located adjacent and movable relative to said first structural member;
   a lever movably affixed to said first structural member;
   a linkage assembly operable to couple said first structural member to said second structural member, wherein movement of said lever relative to said first structural member causes one of said structural members to move relative to the other of said structural members;
   a main gear having a face;
   a first projection extending from said face, said lever being operably coupled to said main gear; and
   a vehicle body latching member movable about said first projection;
   rotation of said main gear moving said body latching member concurrently with movement of said lever.

6. The apparatus of claim 5 further comprising a first end of said lever being bifurcated and a fulcrum operably received within an elongated slot of said lever.

7. The apparatus of claim 1 wherein said first structural member is a front roof rail and said second structural member is a center roof rail.

8. The apparatus of claim 1 further comprising an electric motor rotating and linearly moving said lever.

9. An apparatus for controlling an automotive vehicle convertible roof, said apparatus comprising:
   a front roof rail;
   a second roof rail located behind and movable relative to said front roof rail;

a number one roof bow mounted to said front roof rail;

a number two roof bow mounted to said second roof rail;

a lever movably affixed to one of said roof rails;

an actuator operably moving said lever;

a gear operably driven by said actuator; and a vehicle body latching member pivotable when driven by said gear;

wherein movement of said lever relative to said one of said roof rails causes pivoting between said roof rails.

10. An apparatus for controlling an automotive vehicle convertible roof, said apparatus comprising:

a front roof rail;

a second roof rail located behind and movable relative to said front roof rail;

a number one roof bow mounted to said front roof rail;

a number two roof bow mounted to said second roof rail;

a lever movably affixed to one of said roof rails; and an actuator operably moving said lever;

wherein movement of said lever relative to said one of said roof rails causes pivoting of one of said roof rails relative to the other of said roof rails;

a main gear rotating in response to energization of said actuator, said main gear being rotatably mounted to said front roof rail; and a fulcrum coupled to said one of said roof rails;

wherein rotation of said main gear causes said lever to pivot about said fulcrum to pivot said one of said roof rails.

11. The apparatus of claim 9 further comprising reduction gearing coupling said actuator to said lever.

12. The apparatus of claim 9 further comprising a first end of said lever being bifurcated and a fulcrum being received within an elongated slot of said lever.

13. An apparatus for use in latching a convertible roof to an automotive vehicle body, said apparatus comprising:

an actuator;

a main gear operably rotating about a main pivot axis in response to actuation of said actuator;

a first projection projecting from a face of said main gear offset from said main pivot axis;

a latching member exclusively pivoting about said first projection; and a spring abutting against said latching member;

wherein said latching member rotates from an unlatching position to a latching position in response to rotation of said main gear.

14. The apparatus of claim 13 wherein said latching member rotates along a substantially fore-and-aft vertical plane when moved between said latching and unlatching positions.

15. The apparatus of claim 13 further comprising:

a second main gear;

a second substantially J-shaped hook;

a second projection coupling said second hook to said second main gear; and a number one roof bow of said convertible roof;

wherein said actuator, said main gears and said hooks are mounted to said number one roof bow;

wherein said actuator is an electric motor mounted between said hooks for driving said main gears, and said spring is a leaf spring;

said latching member having an end contacting against said leaf spring.

16. The apparatus of claim 13 further comprising:

an elongated member rotating in response to actuation of said actuator;

a drive gear mounted to and rotating in concert with said elongated member; and an idler gear enmeshed with said drive gear, said idler gear and said drive gear having different gear teeth diameters;

said main gear being rotatably driven by said idler gear, said main gear and said idler gear having different gear teeth diameters, whereby a gear reduction ratio is achieved.

17. The apparatus of claim 13 further comprising:

a second projection rotating in concert with said main gear and being offset from said main pivot axis;

a fulcrum;

an elongated lever having a first end being movably driven by said second projection, said lever pivoting about said fulcrum in response to rotation of said main gear;

a first roof rail, said main gear and said actuator moving in concert with said first roof rail during retraction and extension of said convertible roof;

a linkage assembly; and a second roof rail being movably coupled to said first roof rail by said linkage assembly;

said lever moving said first roof rail relative to said roof rail when said actuator rotates said main gear from a first rotational position to a second rotational position.

18. An apparatus for use in an automotive vehicle having a convertible roof and a body, said apparatus comprising:

an actuator;

a first structural member defining part of said convertible roof;

a second structural member defining part of said convertible roof located adjacent to and being pivotable relative to said first structural member;

a device operably causing said first structural member to pivot relative to said second structural member by energization of said actuator; and a latching mechanism operably fastening said first structural member to said body of said automotive vehicle by energization of said actuator.

19. The apparatus of claim 18 wherein said actuator and said latching mechanism are mounted to said first structural member.

20. The apparatus of claim 18 wherein said first structural member includes a front roof rail and said second structural member is a center roof rail.

21. The apparatus of claim 18 wherein said device includes a lever pivoting and linearly moving about a fulcrum to engage a linkage assembly coupling said structural members together.

22. An apparatus for latching a convertible roof to a body of an automotive vehicle, said apparatus comprising a latching member pivoting from an unlatching position to a latching position about a pivot pin, a spring serving to bias and act as a cam to move said latching member in different predetermined angular orientations during pivoting of said latching member, said latching member contacting against different portions of said spring during pivoting of said latching member.

23. The apparatus of claim 22 further comprising an electric motor causing said latching member to pivot along a substantially vertical plane.

24. The apparatus of claim 22 wherein said spring is a leaf spring and said latching member is a hook.

25. The apparatus of claim 22 wherein said pivot pin revolves around a central rotational axis.

26. The apparatus of claim 22 wherein said latching member and spring are mounted to said convertible roof.

27. A method of operating an automotive vehicle convertible roof having a front roof rail, a center roof rail and an automatically powered actuator, said method comprising the steps of:
 (a) raising said front first roof rail and said power actuator from a retracted position to at least a partially extended position;
 (b) moving said powered actuator in concert with one of said roof rails;
 (c) energizing said powered actuator;
 (d) rotating a lever about a fulcrum; and
 (e) automatically pivoting one of said roof rails relative to the other of said roof rails in response to step (d).

28. The method of claim 27 further comprising the steps of:
 (a) rotating a gear which rotates said lever; and
 (b) moving a linkage assembly coupling said roof rails together.

29. The method of claim 27 further comprising the steps of moving a body latching member and said lever by energizing said power actuator.

30. The method of claim 27 further comprising the step of moving a body latching member concurrently with movement of said lever.

31. An apparatus for controlling an automotive vehicle convertible roof, said apparatus comprising:
 a front roof rail;
 a second roof rail located behind and movable relative to said front roof rail;
 a number one roof bow mounted to said front roof rail;
 a number two roof bow mounted to said second roof rail;
 a lever movably affixed to one of said roof rails;
 an actuator operably moving said lever;
 a gear operably driven by said actuator; and
 said gear operably moving said lever, said actuator and said gear being mounted to at least one of: said number one roof bow and said front roof rail;
 wherein movement of said lever relative to said one of said roof rails causes pivoting between said roof rails.

32. The apparatus of claim 31 further comprising a hinging mechanism coupling said roof rails together, said lever disengagably contacting a portion of said hinging mechanism.

33. The apparatus of claim 31 wherein said lever is linearly and rotatably moveable relative to said front roof rail, and said lever is mounted to said front roof rail.

* * * * *

UNITED STATES PATENT AND TRADEMARK OFFICE
CERTIFICATE OF CORRECTION

PATENT NO. : 6,042,174
DATED : March 28, 2000
INVENTOR(S) : Sheryar Durrani

Page 1 of 1

It is certified that error appears in the above-identified patent and that said Letters Patent is hereby corrected as shown below:

Title Page, Other Publications,
Line 7, "19904" should be -- 1990 --.

Column 8,
Line 28, after "said" (third occurrence) insert -- second --.

Column 9,
Line 28, "power" should be -- powered --.

Signed and Sealed this

Ninth Day of October, 2001

Attest:

*Nicholas P. Godici*

NICHOLAS P. GODICI
*Attesting Officer    Acting Director of the United States Patent and Trademark Office*